United States Patent
Chandramouli et al.

(10) Patent No.: US 12,108,323 B2
(45) Date of Patent: Oct. 1, 2024

(54) METHOD AND APPARATUS FOR CONTROLLING ACCESS TO HOSTED VIRTUAL NETWORK USING NETWORK IDENTIFIERS

(71) Applicant: Nokia Technologies Oy, Espoo (FI)

(72) Inventors: Devaki Chandramouli, Plano, TX (US); Cinzia Sartori, Pullach (DE); Laurent Thiebaut, Antony (FR)

(73) Assignee: Nokia Technologies Oy, Espoo (FI)

( * ) Notice: Subject to any disclaimer, the term of this patent is extended or adjusted under 35 U.S.C. 154(b) by 727 days.

(21) Appl. No.: 16/973,645

(22) PCT Filed: Jun. 18, 2019

(86) PCT No.: PCT/IB2019/055103
§ 371 (c)(1),
(2) Date: Dec. 9, 2020

(87) PCT Pub. No.: WO2019/244033
PCT Pub. Date: Dec. 26, 2019

(65) Prior Publication Data
US 2021/0185590 A1    Jun. 17, 2021

Related U.S. Application Data

(60) Provisional application No. 62/686,571, filed on Jun. 18, 2018.

(51) Int. Cl.
*H04W 48/02*    (2009.01)
*H04L 12/46*    (2006.01)
*H04W 48/10*    (2009.01)

(52) U.S. Cl.
CPC ........ *H04W 48/02* (2013.01); *H04L 12/4641* (2013.01); *H04W 48/10* (2013.01)

(58) Field of Classification Search
CPC ..... H04W 48/02; H04W 48/10; H04W 48/08; H04L 12/4641
See application file for complete search history.

(56) References Cited

U.S. PATENT DOCUMENTS

2007/0183427 A1    8/2007    Nylander et al.
2014/0038610 A1*   2/2014    Jeong ............... H04W 48/10
                                               455/436
(Continued)

FOREIGN PATENT DOCUMENTS

CN    102780601 A    11/2012
CN    105594254 A     5/2016
(Continued)

OTHER PUBLICATIONS

Office action received for corresponding Japanese Patent Application No. 2020-569835, dated Feb. 9, 2022, 3 pages of Office Action and 3 pages of translation available.

(Continued)

*Primary Examiner* — Justin Y Lee
(74) *Attorney, Agent, or Firm* — Nokia Technologies Oy

(57) ABSTRACT

Methods, apparatuses and computer program products are provided to provide access control to a hosted virtual network in a communications system. An example method, apparatus and computer program product is configured to transmit a network identifier associated with a hosted virtual network to one or more allowed user equipment in a coverage area via a radio access network in the coverage area. The network identifier may include a Public Land Mobile Network identifier and a centrally or locally managed network identifier. The network identifier is configured to be stored on the one or more user equipment. The method, apparatus and computer program product is further config- (Continued)

ured to bar access to the hosted virtual network for one or more user equipment that are not allowed user equipment.

12 Claims, 5 Drawing Sheets

(56) References Cited

U.S. PATENT DOCUMENTS

| | | | | |
|---|---|---|---|---|
| 2014/0196142 | A1* | 7/2014 | Louboutin | H04L 63/101 726/16 |
| 2016/0073441 | A1* | 3/2016 | Faccin | H04W 12/06 370/329 |

FOREIGN PATENT DOCUMENTS

| | | | |
|---|---|---|---|
| CN | 107317792 A | | 11/2017 |
| EP | 1947889 A2 | | 7/2008 |
| EP | 3264679 A1 | | 1/2018 |
| JP | 2010-512101 A | | 4/2010 |
| JP | 2015-092675 A | | 5/2015 |
| JP | 2017-528074 A | | 9/2017 |
| WO | 2018/103824 A1 | | 6/2018 |
| WO | WO-2019220234 A1 | * | 11/2019 |

OTHER PUBLICATIONS

"Access Control for NR", 3GPP TSG RAN WG2#99, R2-1708528, Agenda Item:10.4.1.7, Ericsson, Aug. 21-25, 2017, pp. 1-5.
"Unified Access Control", SA WG2 Meeting #119, S2-171165, Agenda Item:TBD, MediaTek Inc., Feb. 13-17, 2017, 4 Pages.
Office action received for corresponding Japanese Patent Application No. 2020-569835, dated Oct. 26, 2022, 3 pages of Office Action and 4 pages of translation available.
Office action received for corresponding Indian Patent Application No. 202147000429, dated Jan. 4, 2022, 6 pages.
"3rd Generation Partnership Project; Technical Specification Group Services and System Aspects; Study on Communication for Automation in Vertical Domains(Release 16)", 3GPP TR 22.804, V2.0.0, May 2018, pp. 1-188.
"3rd Generation Partnership Project; Technical Specification Group Services and System Aspects; Feasibility Study on LAN Support in 5G (Release 16)", 3GPP TR 22.821, V16.0.0, Mar. 2018, pp. 1-52.
"3rd Generation Partnership Project; Technical Specification Group Core Network and Terminals; Non-Access-Stratum (NAS) functions related to Mobile Station (MS) in idle mode(Release 15)", 3GPP TS 23.122, V15.3.0, Mar. 2018, pp. 1-58.
"New SID on Enhanced Support of Vertical and LAN Services", SA WG2 Meeting #S2-127bis, S2-186182, Agenda : 7.1, Nokia, May 28-Jun. 1, 2018, 3 pages.
"3rd Generation Partnership Project; Technical Specification Group Services and System Aspects; System Architecture for the 5G System; Stage 2 (Release 16)", 3GPP TS 23.501, V16.0.2, Apr. 2019, pp. 1-317.
International Search Report and Written Opinion received for corresponding Patent Cooperation Treaty Application No. PCT/IB2019/055103, dated Nov. 4, 2019, 16 pages.
"CE Level based access Barring and Load Control for eFeMTC and FeNB-IoT", 3GPP TSG RAN WG2 Meeting #99, R2-1709044, Agenda : 9.14.5, Intel Corporation, Aug. 21-25, 2017, 3 pages.
"3rd Generation Partnership Project; Technical Specification Group Core Network and Terminals; Numbering, addressing and identification; (Release 16)", 3GPP TS 23.003, V16.4.0, Sep. 2020, pp. 1-141.
Office action received for corresponding European Patent Application No. 19763084.1, dated Jun. 28, 2023, 7 pages.

* cited by examiner

METHOD AND APPARATUS FOR CONTROLLING ACCESS TO HOSTED VIRTUAL NETWORK USING NETWORK IDENTIFIERS

RELATED APPLICATION

This application claims priority to PCT Application No. PCT/IB2019/055103, filed on Jun. 18, 2019, which claims priority to U.S. Provisional Application No. 62/687,003, filed on Jun. 19, 2018, each of which is incorporated herein by reference in its entirety.

The present application claims priority to U.S. Provisional Application Ser. No. 62/686,571, titled "METHOD AND APPARATUS FOR CONTROLLING ACCESS TO HOSTED VIRTUAL NETWORK USING NETWORK IDENTIFIERS," filed Jun. 18, 2018, the contents of which are incorporated herein by reference in their entirety.

TECHNICAL FIELD

An example embodiment relates generally to a method, apparatus and computer program product for controlling access to a hosted virtual network for user equipment (UE) in a network, such as a fifth generation (5G) network, by using a network identifier.

BACKGROUND 5G network systems extend mobile communication services into different vertical domains and support applications for production in the different vertical domains. Example vertical domains include industrial automation, energy automation, and transportation. Specific security measures and isolation network properties may be required for the different vertical domains. Therefore, a physical communication network with a common shared physical infrastructure may be split into different hosted virtual networks that are isolated. Communication in the vertical domains may take place in a type-a (e.g., exclusive) and/or a type-b hosted virtual networks (e.g., private).

The 3$^{rd}$ Generation Partnership Project (3GPP) has provided techniques, such as network slicing, to enable providing different virtual networks in a physical network. However, the network slicing technique provided by 3GPP does not provide the desired degree of isolation. For example, non-dedicated networking slices are not able to provide a UE with the ability to directly access a network slice using network selection procedures without first requiring mobile network operation (MNO) access authentication. In addition, a network slicing technique cannot prohibit non-allowed UEs from communicating with a network slice via a random access channel (RACH), resulting in wasted network resources to handle these communications from non-allowed UEs. Even though the network slice may be able to deny access to the network slice after a non-allowed UE attempts to access the network slice, communication resources are still consumed by the request attempted by a non-allowed UE.

BRIEF SUMMARY

A method, apparatus and computer program product are provided in order to provide access control to a hosted virtual network in a communications system.

In one example embodiment, a method is provided that includes transmitting a network identifier associated with a hosted virtual network to one or more allowed user equipment in a coverage area via a radio access network in the coverage area. The network identifier is configured to be stored on the one or more user equipment. The method also includes barring access to the hosted virtual network for one or more user equipment that are not allowed user equipment.

In some implementations of such a method, the network identifier includes a mobile network operator managed identifier and a Public Land Mobile Network identifier. In some embodiments, the network identifier includes a neutral host network identifier. In some embodiments, the network identifier includes a service set identifier and a Public Land Mobile Network identifier. In some embodiments, barring access to the hosted virtual network for one or more user equipment that are not allowed user equipment includes assigning an access identity to the one or more allowed user equipment and denying access to a broadcast channel associated with the hosted virtual network for one or more user equipment that are not the one or more allowed user equipment. In some embodiments, barring access to the hosted virtual network for one or more user equipment that are not allowed user equipment includes broadcasting, via a broadcast channel and by using the radio access network, that the hosted virtual network permits access only to the one or more allowed user equipment and denying access to the hosted virtual network for one or more user equipment that are not the one or more allowed user equipment.

In another example embodiment, an apparatus is provided that includes means for transmitting a network identifier associated with a hosted virtual network to one or more allowed user equipment in a coverage area via a radio access network in the coverage area, wherein the network identifier is configured to be stored on the one or more user equipment. The apparatus also includes means for barring access to the hosted virtual network for one or more user equipment that are not allowed user equipment.

In some implementations of such an apparatus, the network identifier includes a mobile network operator managed identifier and a Public Land Mobile Network identifier. In some embodiments, the network identifier includes a neutral host network identifier. In some embodiments, the network identifier includes a service set identifier and a Public Land Mobile Network identifier. In some embodiments, the apparatus further includes means for assigning an access identity to the one or more allowed user equipment and means for denying access to a broadcast channel associated with the hosted virtual network for one or more user equipment that are not the one or more allowed user equipment. In some embodiments, the apparatus further includes means for broadcasting, via a broadcast channel and by using the radio access network, that the hosted virtual network permits access only to the one or more allowed user equipment and means for denying access to the hosted virtual network for one or more user equipment that are not the one or more allowed user equipment.

In another example embodiment, an apparatus is provided that includes at least one processor and at least one memory including computer program code for one or more programs, the at least one memory and the computer program code configured to, with the at least one processor, cause the apparatus at least to: transmit a network identifier associated with a hosted virtual network to one or more allowed user equipment in a coverage area via a radio access network in the coverage area and bar access to the hosted virtual network for one or more user equipment that are not allowed user equipment. The network identifier is configured to be stored on the one or more user equipment.

In some implementations of such an apparatus, the network identifier includes a mobile network operator managed identifier and a Public Land Mobile Network identifier. In some embodiments, the network identifier includes a neutral host network identifier. In some embodiments, the network identifier includes a service set identifier and a Public Land Mobile Network identifier. In some embodiments, the at least one memory and the computer program code are further configured to, with the at least one processor, cause the apparatus to assign an access identity to the one or more allowed user equipment and deny access to a broadcast channel associated with the hosted virtual network for one or more user equipment that are not the one or more allowed user equipment. In some embodiments, barring access to the hosted virtual network for one or more user equipment that are not allowed user equipment includes broadcasting, via a broadcast channel and by using the radio access network, that the hosted virtual network permits access only to the one or more allowed user equipment and denying access to the hosted virtual network for one or more user equipment that are not the one or more allowed user equipment.

In another example embodiment, a computer program product is provided that includes at least one non-transitory computer-readable storage medium having computer executable program code instructions stored therein, the computer executable program code instructions comprising program code instructions configured, upon execution, to: transmit a network identifier associated with a hosted virtual network to one or more allowed user equipment in a coverage area via a radio access network in the coverage area; and bar access to the hosted virtual network for one or more user equipment that are not allowed user equipment. The network identifier is configured to be stored on the one or more user equipment.

In some implementations of such a computer program product, the network identifier includes a mobile network operator managed identifier and a Public Land Mobile Network identifier. In some embodiments, the network identifier includes a neutral host network identifier. In some embodiments, the network identifier includes a service set identifier and a Public Land Mobile Network identifier. In some embodiments, the program code instructions is further configured, upon execution, to assign an access identity to the one or more allowed user equipment and deny access to a broadcast channel associated with the hosted virtual network for one or more user equipment that are not the one or more allowed user equipment. In some embodiments, the program code instructions is further configured, upon execution, to broadcast, via a broadcast channel and by using the radio access network, that the hosted virtual network permits access only to the one or more allowed user equipment and deny access to the hosted virtual network for one or more user equipment that are not the one or more allowed user equipment.

BRIEF DESCRIPTION OF THE DRAWINGS

Figure 1:
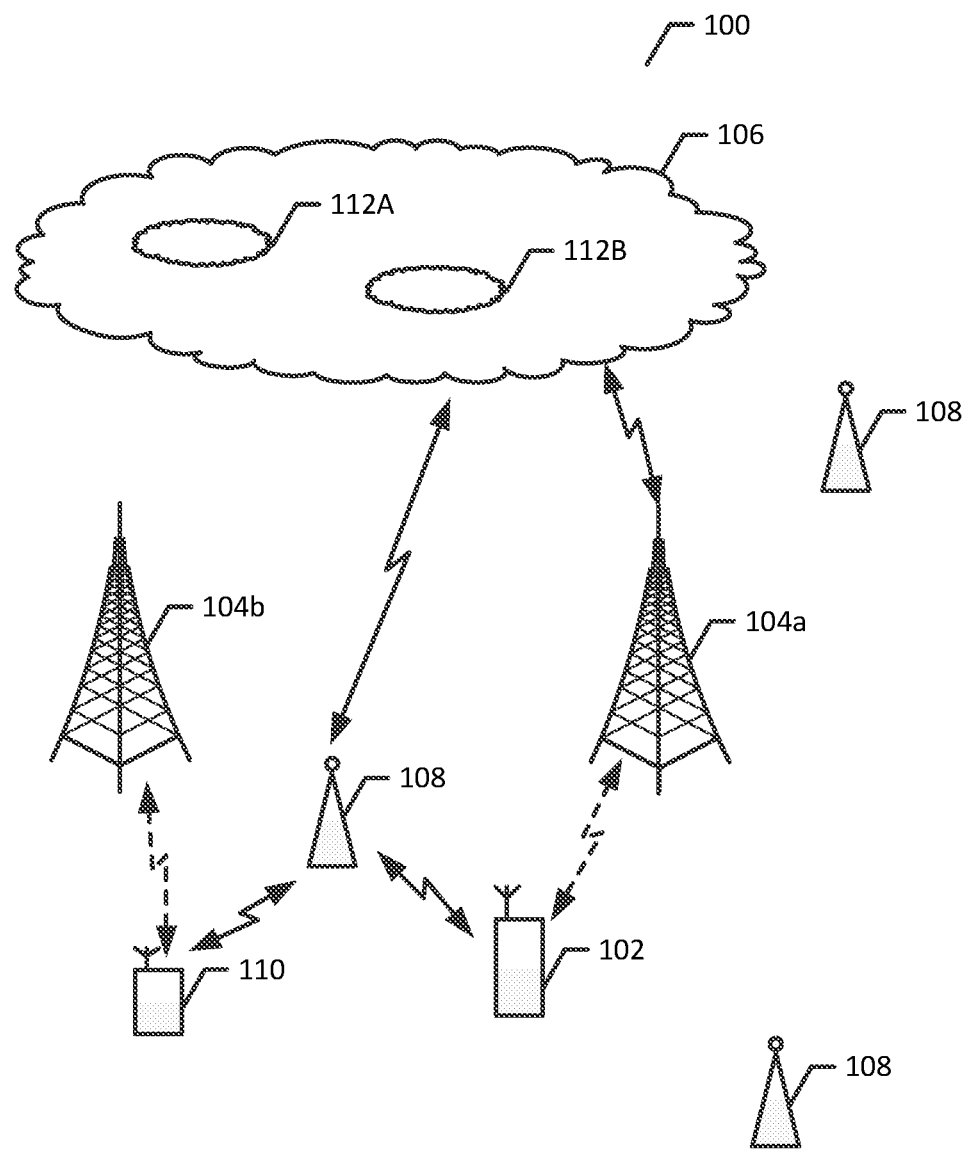
Figure 2:
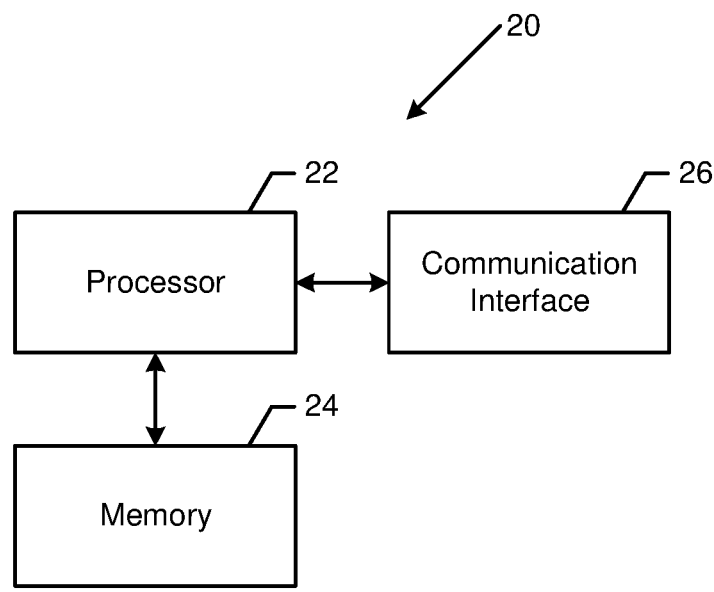
Figure 3:
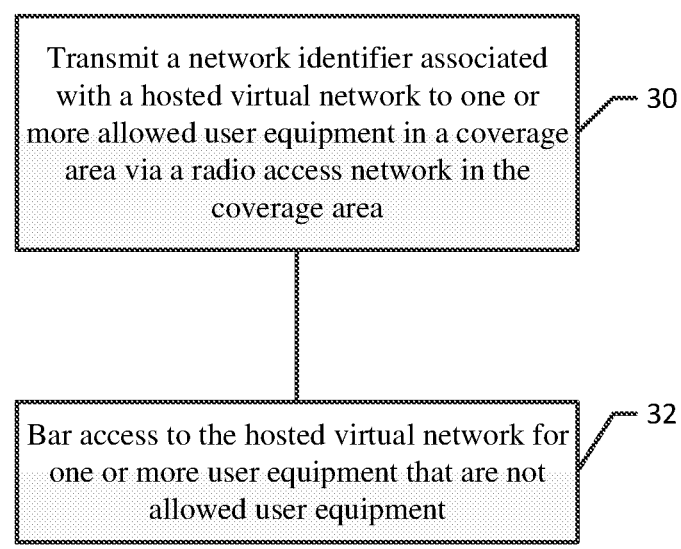
Figure 4:
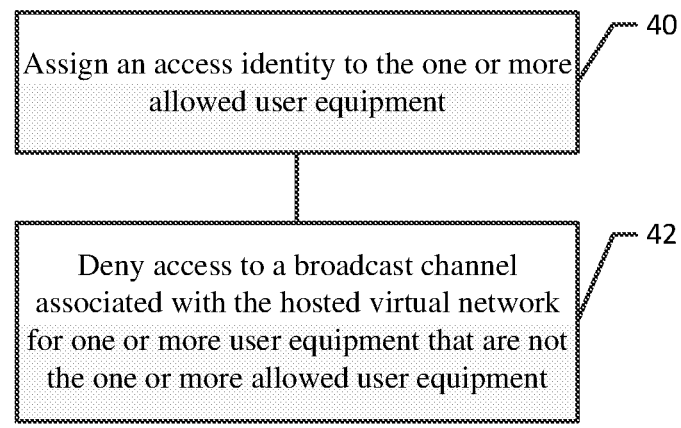
Figure 5:
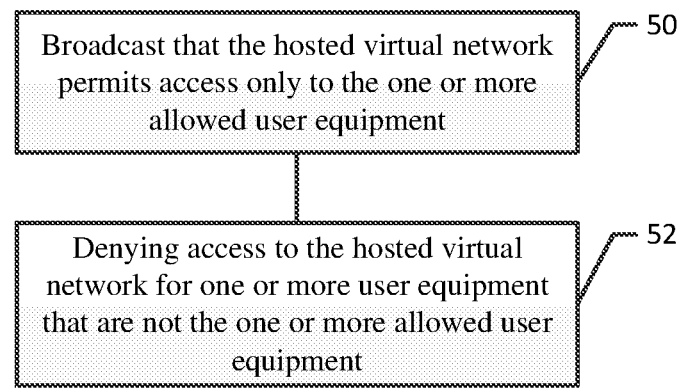

Having thus described certain example embodiments of the present disclosure in general terms, reference will hereinafter be made to the accompanying drawings, which are not necessarily drawn to scale, and wherein:

FIG. 1 depicts a system that may benefit from the procedures discussed and contemplated herein in accordance with an example embodiment of the present disclosure;

FIG. 2 is a block diagram of an apparatus configured in accordance with an example embodiment in order to control access to a hosted virtual network;

FIG. 3 illustrates operations performed, such as by the apparatus of FIG. 2, in order to control access to a hosted virtual network in accordance with an example embodiment of the present disclosure;

FIG. 4 illustrates operations performed, such as by the apparatus of FIG. 2, in order to bar access to the hosted virtual network for user equipment that is not allowed in accordance with an example embodiment of the present disclosure; and FIG. 5 illustrates alternative operations performed, such as by the apparatus of FIG. 2, in order to bar access to the hosted virtual network for user equipment that is not allowed in accordance with an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

As defined herein, a "network identifier" for a "private network" or "exclusive network" refers to a network identifier (ID) associated with a hosted virtual network in a communication system, such as a 5G communication system, that is not assigned to a public network available for all subscribers. Example network identifiers include a combination of a an identifier of a public network and an identifier of a hosted virtual network within the public network, such as a shared PLMN (Public Land Mobile Network) ID and a MNO managed identifier, a PLMN ID along with a centrally managed unique ID (unique within a country) (such as a centrally managed unique ID assigned by a regulatory body) assigned to the hosted virtual network, a globally unique ID assigned to a network, a service set ID (SSID) along with a PLMN ID, a neutral hosted network ID, or the like. A network identifier is unique to the hosted virtual network at least in a coverage area of the hosted virtual network. Even though a PLMN ID may be part of the network identifier, a PLMN ID cannot be the only ID in the network identifier. The network identifier may be broadcasted by a radio access network (RAN) in its coverage area to one or more allowed UEs to allow network selection.

A method, apparatus and computer program product are provided in order to provide access control to a hosted virtual network in a communications system, such as a 5G communication system. Because of the specific security measures and isolation network properties required for the different vertical domains, each hosted virtual network os isolated, that is, separate from each other and separate from PLMN communications in the same physical communication network, and data flow communications in each hosted virtual network are isolated. Therefore, UEs use network selection to locate and access these hosted virtual networks. In addition, because of potential congestion problems and security issues, a hosted virtual network of an example embodiment needs to be able to prohibit UEs not belonging to the hosted virtual network from selecting/reselecting the cell of the hosted virtual networks or attempting to access by sending a channel request via a random-access channel (RACH, also referred as a "broadcast channel").

Hosted virtual networks are isolated virtual networks (e.g., separate from each other and separate from PLMN communications) sharing a common physical network infrastructure. Data flow communications in each hosted virtual network is isolated. UEs are allowed to use network selection to locate and access these hosted virtual networks. A hosted virtual network may be configured to prohibit UEs that are not allowed to access the hosted virtual network from selecting/reselecting the cell of the hosted virtual networks or attempting to access the hosted virtual network by sending a channel request, such as via the RACH.

In an example embodiment, each hosted virtual network may be associated with a specific virtual domain. A vertical domain is a particular industry or group of enterprises in which similar products or services are developed, produced, and provided. Example vertical domains include rail-bound mass transit, building automation, factory of the future, smart city, electric-power distribution, central power generation, special events, smart agriculture, and/or the like.

An identifier associated with a hosted virtual network may be transmitted to one or more allowed UEs in a coverage area via a RAN in the coverage area. The network identifier is configured to be stored on the one or more user equipment. Access to the hosted virtual network will be barred for UEs that do not have the network identifier. In some embodiments, a RAN in the coverage area may broadcast information indicating that access for the hosted virtual network is barred for non-allowed UEs and non-allowed UEs may be prohibited from communicating with the hosted virtual network, such as via the RACH. In some embodiments, the hosted virtual network assigns a special access identity or access class to allowed UEs. UEs without the special access identity are not capable of initiating access towards the hosted virtual network, such as via the RACH. Even though example embodiments of the invention are described in conjunction with a 5G communication, the method, apparatus and computer program may be deployed in other communication systems, such as a LTE (Long-Term Evolution) communication system, a UMTS (universal mobile telecommunications system), or the like.

While the method, apparatus and computer program product of an example embodiment may be deployed in a variety of different systems, one example of a system that may benefit from the procedures discussed and contemplated herein in accordance with an example embodiment of the present disclosure is depicted in FIG. 1. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present disclosure. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment 102 configured to communicate wirelessly, such as via an access network, with a physical network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems.

In addition to the more traditional types of user equipment 102 which may be present within a given system environment, system environment 100 also optionally includes one or more Internet-of-Things (IoT) user equipment devices 110, which may be referred to as IoT devices. Although the IoT device may be configured in a variety of different manners, the IoT devices 110 may be embodied as cellular IoT (C-IoT) devices, narrowband IoT (NB-IoT) devices, and/or other IoT devices, including but not limited to vehicles, appliances, mechanical equipment, wearable devices and/or other devices that have been configured to allow for communications and/or other interactions with a network environment.

System environment 100, as depicted in FIG. 1, also includes one or more access points 104a and 104b, such as base stations (such as node Bs, evolved Node Bs (eNB), or the like, for example). A cellular access point, such as a base station, may define and service one or more cells. The access points may, in turn, be in communication with a physical network 106, such as a core network via a gateway, such that the access points establish cellular radio access networks by which the user equipment 102 and/or IoT devices 110 may communicate with the network. The system environment 100 of FIG. 1 may include a plurality of different cellular radio access networks including, for example, a 5G radio access network, an LTE radio access network, a UMTS radio access network, etc. In some example implementations, equipment and other infrastructure associated with multiple different cellular radio access networks may be located at or near structures and/or other equipment associated with a particular access point, such as access point 104a and 104b.

In some implementations of system environment 100, the cellular radio access networks serviced by access points 104a, 104b, and any other access points in a given area are identical, in the sense that as user equipment 102 and/or IoT device 110 move from an area serviced by access point 104a to an area serviced by access point 104b, the user equipment 102 and/or IoT device 110 is able to access the physical network 106 via a radio access network provided by the same vendor across access points. Several hosted virtual networks 112A and 112B may be hosted on the physical network 106. Although not shown, the system may also include a controller associated with one or more of the cellular access points, (such as base stations for example), so as to facilitate operation of the access points and management of the user equipment 102 and/or IoT device 110 in communication therewith.

In order to provide access control to the hosted virtual network 112A and 112B, an apparatus 20 is provided and as shown, for example, in FIG. 2. The apparatus may be embodied by any of a variety of different components and, in one embodiment, is embodied by virtual network controlling infrastructure in a 5G communication system. As shown in FIG. 2, the apparatus of an example embodiment includes, is associated with or is otherwise in communication with a processor 22, an associated memory 24 and a communication interface 26.

The processor 22 (and/or co-processors or any other circuitry assisting or otherwise associated with the processor) may be in communication with the memory device 24 via a bus for passing information among components of the apparatus 20. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present disclosure. For example, the memory device could be configured to buffer input data for processing by the processor. Additionally or alternatively, the memory device could be configured to store instructions for execution by the processor.

The apparatus 20 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device configured to employ an embodiment of the present disclosure by further configuration of the processor by instructions for performing the algorithms and/or operations described herein. The processor may include, among other things, a clock, an arithmetic logic unit (ALU) and logic gates configured to support operation of the processor.

The communication interface 26 may be any means such as a device or circuitry embodied in either hardware or a combination of hardware and software that is configured to receive and/or transmit data from/to a network. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

The operations performed by the apparatus 20 in order to provide access control to the hosted virtual network 112A and 112B, are depicted in a flowchart of FIG. 3 and specific details regarding barring access for non-allowed UEs are described in conjunction with flowcharts FIG. 4 and FIG. 5.

As shown in block 30, the apparatus includes means, such as the processor 22, the communication interface 26 or the like, for transmitting a network identifier associated with a hosted virtual network to one or more allowed user equipment in a coverage area via a radio access network in the coverage area. The network identifier is configured to be stored on the one or more user equipment.

A network identifier is a network identifier associated with a hosted virtual network in a communication system, such as a 5G communication system, that is not assigned to a public network available for all subscribers. Example network identifier include a package of a MNO managed identifier and a PLMN ID, a package of a PLMN ID and a centrally managed ID (e.g., a centrally managed ID assigned by a regulatory body), a SSID, a neutral hosted network ID, or the like. The network identifier associated with the hosted virtual network may be broadcasted by a RAN in its coverage area to one or more allowed UEs to allow network selection. In some embodiments, the network identifier may include a PLMN ID along with another privately or centrally managed identifier. A hosted virtual network may be a type-a (e.g., exclusive) or a type-b (e.g., private) network in a communication system, such as a 5G communication system.

In some embodiments, a hosted virtual network may be identified the network identifier which takes any of the following format: 1) a combination of a PLMN ID and a MNO managed identifier, 2) a combination of a PLMN ID and a centrally managed ID assigned by a regulatory body, such as a regulatory body in a vertical domain associated with the hosted virtual network, 3) a globally unique ID such as a neutral hosted network ID, or 4) a combination of a PLMN ID and a SSID. The neutral hosted network ID may be managed by 3GPP. The SSID may be centrally managed and ensured to be locally unique within the coverage area of the network. For example, if an industry in the Munich, Germany area offers a private hosted virtual network, then the industry should ensure that the selected SSID is not in conflict with the SSIDs offered by the network in the same coverage area.

The network identifier (which may include a PLMN ID) may be configured to be stored by the allowed user equipment. The allowed UEs may store the network identifier as part of its home network information. In some embodiments, the home network information may be implemented similar to a Home PLMN (HPLMN) or Equivalent HPLMN (EHPLMN) list. Network selection algorithms, such as a network selection algorithm for network selection based on only PLMN ID in technical specification 23.112 published by 3GPP, may be utilized to support network selection using the network identifier.

As shown in block 32, the apparatus also includes means, such as the processor 22, the communication interface 26 or the like, for barring access to the hosted virtual network for one or more user equipment that are not allowed user equipment. Two example techniques for barring access to the to the hosted virtual network for one or more user equipment that are not allowed user equipment are described in conjunction with FIGS. 4 and 5 by way of example, but not of limitation.

Referring now to FIG. 4 and as shown in block 40, the apparatus includes means, such as the processor 22, the communication interface 26 or the like, for assigning an access identity or access class to the one or more allowed user equipment. UEs assigned the access identity or access class is allowed to initiate access, such as via the RACH, towards the hosted virtual network in order to access the hosted virtual network. UEs without the special access identity are not capable of initiating access, such as via the RACH, towards the hosted virtual network.

As shown in block 42, the apparatus includes means, such as the processor 22, the communication interface 26 or the like, for denying access to a broadcast channel (such as RACH) associated with the hosted virtual network for one or more user equipment that are not the one or more allowed user equipment. Therefore, UEs without the access identity or access class are not capable of initiating access, such as via the RACH, towards the hosted virtual network. Therefore, network resources will not be undesirably consumed by UEs that are not allowed UEs. In some embodiments, the access identity or access class may be assigned via a MNO. Alternatively or additionally, the access identity or access class may be assigned directly from an operator of the hosted virtual network. This embodiment leverages existing access control framework specified as part of UAC. One drawback of this embodiment is that the operator of the hosted virtual network could not define its own access categories without MNO interference.

Referring now to FIG. 5 and as shown in block 40, the apparatus includes means, such as the processor 22, the communication interface 26 or the like, for broadcasting that the hosted virtual network permits access only to the one or more allowed user equipment via a RAN. As shown in block 42, the apparatus also includes means, such as the processor 22, the communication interface 26 or the like, for denying access to the hosted virtual network for one or more user equipment that are not the one or more allowed user equipment. For example, the default setting may be that only allowed user equipment with the network identifier stored are allowed to access the hosted virtual network. In some embodiments, additional access control categories may be introduced to the allowed user equipment according to specific needs or requirements of the vertical domain and/or the operator of the hosted virtual network. By assigning a new access identity under a new access control framework, this embodiment allows the hosted virtual network to assign additional access control categories.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 3-5. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
transmitting a network identifier associated with a private hosted virtual network to one or more user equipment in a coverage area via a radio access network in the coverage area to allow the one or more user equipment to select the private hosted virtual network, wherein the network identifier is configured to be stored on the one or more user equipment, wherein the network identifier comprises a Public Land Mobile Network Identifier and an identifier of the private hosted virtual network; and
assigning an access identity to at least one user equipment of the one or more user equipment that is allowed to select the private hosted virtual network to allow the at least one user equipment to initiate access via a random access channel towards the private hosted virtual network.

2. The method according to claim 1, wherein the identifier of the private hosted virtual network comprises a locally managed identifier.

3. The method according to claim 1, wherein the identifier of the private hosted virtual network comprises a centrally managed identifier.

4. The method according to claim 1, further comprising:
receiving a channel request via a random access channel from the at least one user equipment; and
allowing the at least one user equipment to access the hosted virtual network.

5. An apparatus comprising at least one processor and at least one memory including computer program code for one or more programs, the at least one memory and the computer program code configured to, with the at least one processor, cause the apparatus at least to perform:
transmitting a network identifier associated with a private hosted virtual network to one or more user equipment in a coverage area via a radio access network in the coverage area to allow the one or more allowed user equipment to select the private hosted virtual network, wherein the network identifier is configured to be stored on the one or more user equipment, wherein the network identifier comprises a Public Land Mobile Network Identifier and an identifier of the hosted virtual network; and
assigning an access identity to at least one user equipment of the one or more user equipment that is allowed to select the private hosted private virtual network to allow the at least one user equipment to initiate access via a random access channel towards the private hosted virtual network.

6. The apparatus according to claim 5, wherein the identifier of the private hosted virtual network comprises a locally managed identifier.

7. The apparatus according to claim 5 wherein the of the private hosted virtual network identifier comprises a centrally managed identifier.

8. The apparatus according to claim 5, wherein the at least one memory and the computer program code are configured to, with the at least one processor, further cause the apparatus at least to perform:
receiving a channel request via a random access channel from the at least one user equipment; and
allowing the at least one user equipment to access the hosted virtual network.

9. A non-transitory computer-readable storage medium having computer-executable program code instructions stored therein, the computer-executable program code instructions comprising program code instructions configured, upon execution, to perform:
transmitting a network identifier associated with a private hosted virtual network to one or more user equipment in a coverage area via a radio access network in the coverage area to allow the one or more allowed user equipment to select the private hosted virtual network, wherein the network identifier is configured to be stored on the one or more user equipment, wherein the network identifier comprises a Public Land Mobile Network Identifier and an identifier of the private hosted virtual network; and
assigning an access identity to at least one user equipment of the one or more user equipment that is allowed to select the private hosted virtual network to allow the at least one user equipment to initiate access via a random access channel to the private hosted virtual network.

10. The non-transitory computer-readable storage medium according to claim 9 wherein the identifier of the private hosted virtual network comprises a locally managed identifier.

11. The non-transitory computer-readable storage medium according to claim 9 wherein the identifier of the private hosted virtual network comprises a centrally managed identifier.

12. The non-transitory computer-readable medium according to claim 9, wherein the computer-executable program code instructions comprise program code instructions configured, upon execution, to:
receive a channel request via a random access channel from the at least one user equipment; and
allow the at least one user equipment to access the hosted virtual network.

* * * * *